United States Patent
Bowers

(10) Patent No.: US 10,960,755 B2
(45) Date of Patent: Mar. 30, 2021

(54) VEHICLE FUEL STORAGE SYSTEM, AND METHODS OF USE AND MANUFACTURE THEREOF

(71) Applicant: Honda Motor Co., Ltd., Tokyo (JP)

(72) Inventor: Shawn L. Bowers, Hilliard, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 1090 days.

(21) Appl. No.: 15/145,613

(22) Filed: May 3, 2016

(65) Prior Publication Data
US 2017/0320387 A1    Nov. 9, 2017

(51) Int. Cl.
*B60K 15/04*    (2006.01)

(52) U.S. Cl.
CPC ........ *B60K 15/04* (2013.01); *B60K 2015/047* (2013.01); *B60K 2015/0432* (2013.01); *B60K 2015/0474* (2013.01); *B60Y 2410/114* (2013.01)

(58) Field of Classification Search
CPC ........ B60K 15/0487; B60K 2015/0487; B60K 2015/0474; B60K 2015/047; B60K 15/01; B60Y 2410/114; F16L 3/1226
See application file for complete search history.

(56) References Cited

U.S. PATENT DOCUMENTS

| | | | | |
|---|---|---|---|---|
| 2,372,674 A * | 4/1945 | Russ | ................................ | 248/65 |
| 4,469,339 A * | 9/1984 | Watanabe | .............. | B60K 15/04 280/834 |
| 7,367,101 B2 * | 5/2008 | Takahashi | ............ | B60K 15/035 248/214 |
| 7,422,242 B2 * | 9/2008 | Matsumoto | ............ | B60K 15/04 280/834 |
| 7,594,583 B2 * | 9/2009 | Whipple | ................ | B60K 15/04 220/86.2 |
| 8,020,718 B2 * | 9/2011 | Jung | ...................... | C25D 11/04 141/286 |
| 8,627,912 B2 * | 1/2014 | Mulanon | .......... | B60K 15/03006 141/331 |
| 9,150,098 B2 * | 10/2015 | Fujiwara | ................ | B60K 15/01 |
| 9,776,501 B2 * | 10/2017 | Dominic | ................ | B60K 15/01 |

(Continued)

FOREIGN PATENT DOCUMENTS

| | | | | |
|---|---|---|---|---|
| CN | 204236230 U | | 4/2015 | |
| DE | 3628326 A1 * | | 4/1987 | ............ F16L 3/1226 |

(Continued)

*Primary Examiner* — Anthony D Stashick
*Assistant Examiner* — Blaine G Neway
(74) *Attorney, Agent, or Firm* — Kenealy Vaidya LLP

(57) ABSTRACT

Some embodiments are directed to a cover assembly for a fuel filler pipe that is disposed adjacent vehicle suspension components. The cover assembly can include a first cover portion that includes a first extension that extends in a first direction and a second extension that extends in a second direction that intersects the first extension at an angle, the first cover portion forming a channel defined by a first cover portion wall that is configured to wrap around a portion of an outer perimeter of the fuel filler pipe so as to leave a section of the outer perimeter of the fuel filler pipe exposed so as to permit movement of the exposed outer perimeter section, the first cover portion being configured to extend more than half a length of the fuel filler pipe.

20 Claims, 9 Drawing Sheets

(56) References Cited

U.S. PATENT DOCUMENTS

| | | | | |
|---|---|---|---|---|
| 2004/0094340 A1* | 5/2004 | Kawasaki | ............... | B60K 15/01 180/65.1 |
| 2006/0273571 A1* | 12/2006 | Matsumoto | ............ | B60K 15/04 280/834 |
| 2007/0205193 A1* | 9/2007 | Whipple | ................. | B60K 15/04 220/86.1 |
| 2011/0278880 A1* | 11/2011 | Tsuyuzaki | ............... | B60J 5/0425 296/187.11 |
| 2013/0192714 A1* | 8/2013 | Wagner | ................... | B60K 15/04 141/98 |
| 2013/0320155 A1* | 12/2013 | Okabe | ..................... | B60K 15/01 248/65 |
| 2014/0103039 A1* | 4/2014 | Fujiwara | ................. | B60K 15/01 220/86.2 |
| 2015/0108792 A1* | 4/2015 | Mildner | ................. | B60K 15/05 296/198 |
| 2015/0274008 A1* | 10/2015 | Kito | ........................ | B60K 15/04 141/311 R |
| 2015/0291021 A1* | 10/2015 | Ogiwara | ................ | B60K 15/04 220/562 |
| 2015/0360727 A1* | 12/2015 | Miwa | ...................... | B60K 15/01 280/124.109 |
| 2017/0021724 A1* | 1/2017 | Eulitz | .................... | B60K 15/01 |
| 2017/0320387 A1* | 11/2017 | Bowers | .............. | B60K 15/0406 |

FOREIGN PATENT DOCUMENTS

| | | |
|---|---|---|
| DE | 10114275 A1 | 9/2002 |
| JP | 3959954 B2 | 8/2007 |
| JP | 5286132 B2 | 10/2010 |
| JP | 2015107702 A | 6/2015 |
| JP | 2015148274 A | 8/2015 |
| KR | 20030026461 A | 4/2003 |
| RU | 105375 U1 | 6/2011 |

* cited by examiner

VEHICLE FUEL STORAGE SYSTEM, AND METHODS OF USE AND MANUFACTURE THEREOF

BACKGROUND

The disclosed subject matter relates to a vehicle fuel storage system and methods of use and manufacture thereof. In particular, the disclosed subject matter relates to methods and apparatus for controlling a layout of a fuel storage system pipe and providing barriers to impede damage to fuel storage system piping.

Many types of vehicles, such as those that travel on land, through water, by air, etc. require a supply of fuel to power an internal combustion engine. The transport of fuel from one storage location to another requires the use a fuel supply system, which generally can be configured with piping or other conduit that extends from the location of fuel take-on to a fuel storage tank. The route of travel of such a conduit can be a generally straight pathway, or it can include one or more elbow(s) or other turn(s) in order to accommodate vehicle structures and components. Fuel supply systems on vehicles typically include a filler tube or pipe fluidly connected to a fuel tank for refilling the fuel tank.

SUMMARY

A fuel filler cap can be secured to a filling port of the filler pipe to close the pipe when not in use. During refueling, the cap is removed to provide access to the filler pipe by a refueling nozzle. In some vehicles, a capless refueling system is used, such that a fuel filler cap is not necessary. In refueling a vehicle with gasoline or diesel fuel, the refueling nozzle is inserted into the vehicle's filler pipe and fuel is discharged under pressure through the nozzle, with fuel flow controlled by a suitable valve, often manually controlled. The fuel travels through the filler pipe and into the fuel tank communicating with the filler pipe, while the operator either manually holds a valve open, or utilizes an automatic shutoff device for terminating fuel flow as the fuel tank reaches a full configuration.

Fuel filler pipes are intended to accept fuel from a dispenser nozzle and deliver it to a fuel tank. Fuel filler pipes are often shaped with one or more bends to allow the pipes to fit around other components in a vehicle. The complexity of paths around vehicle components may make directing the flow of fuel to the fuel tank more difficult. Flow rate may decrease as fluid turbulence increases; therefore, it may be desirable to have a fuel filler pipe that reduces or eliminates turbulence in an incoming fuel stream by shaping the fuel filler pipe with as few bends as possible.

Some vehicle fuel supply systems perform a function of directing a fuel filler pipe around vehicle components in order to provide a more efficient fluid path between a filling port and a fuel tank. The fuel filler pipe layout in such systems is typically proximate vehicle components. However, it may be possible for the fuel filler pipe to inadvertently contact other vehicle component(s) when a change in shape, size and/or position of the fuel filler pipe occurs during operation of the vehicle. A change in the shape, size and/or position of the fuel filler pipe can be caused by thermal expansion of the fuel filler pipe due to ambient conditions, operation of the vehicle, and/or a refueling operation.

Some vehicle fuel supply systems also perform a function of forming a barrier between the fuel supply system and the environment outside of the vehicle. For example, these fuel supply systems impede the impact of various types of substances or conditions, such as gasses, liquids, solids, debris, etc., which are disposed or otherwise outside of the vehicle. However, it may be challenging for such vehicle supply systems to form an effective barrier to impede the impact of these substances upon portions of a fuel supply system that are exposed to the environment during operation of a vehicle.

It may therefore be beneficial to address at least one of the issues discussed above and/or other issues. For example, it may be beneficial to provide methods and apparatus that include a cover assembly for a fuel filler pipe. The embodiments are therefore directed to a cover assembly for a fuel filler pipe that is disposed adjacent vehicle suspension components. The cover assembly can include a first cover portion that includes a first extension that extends in a first direction and a second extension that extends in a second direction that intersects the first extension at an angle, the first cover portion forming a channel defined by a first cover portion wall that is configured to wrap around a portion of an outer perimeter of the fuel filler pipe so as to leave a section of the fuel filler pipe exposed so as to permit movement of the exposed outer perimeter section, the first cover portion being configured to extend more than half a length of the fuel filler pipe. The cover assembly can also include a pair of mounts that includes a first mount defining a first mount aperture and a second mount defining a second mount aperture, an axis of the first mount aperture being substantially perpendicular to an axis of the second mount aperture.

Some other embodiments are directed to a vehicle fuel storage system. The vehicle fuel storage system can include a fuel tank, a fuel filler pipe attached at one end to the fuel tank, and a first cover portion that includes a first extension that extends in a first direction and a second extension that extends in a second direction that intersects the first extension at an angle. The first cover portion can form a channel defined by a first cover portion wall that is configured to wrap around a portion of an outer perimeter of the fuel filler pipe so as to leave a section of the fuel filler pipe exposed so as to permit movement of the exposed outer perimeter section, the first cover portion being configured to extend more than half a length of the fuel filler pipe. The vehicle fuel storage system can also include a pair of mounts that includes a first mount defining a first mount aperture and a second mount defining a second mount aperture, an axis of the first mount aperture being substantially perpendicular to an axis of the second mount aperture.

Still other embodiments are directed to a method for limiting movement of a fuel filler pipe that is disposed adjacent suspension components in a vehicle. The method includes providing a cover assembly having a first portion that extends along a majority of a length of the fuel filler pipe and wraps around a portion of an outer perimeter of the fuel filler pipe so as to leave a section of the fuel filler pipe exposed so as to permit movement of the exposed outer perimeter section. The method can also include mounting a cover assembly to the vehicle in a first direction, and mounting the cover assembly to the vehicle in a second direction that is substantially perpendicular to the first direction.

BRIEF DESCRIPTION OF THE DRAWINGS

The disclosed subject matter of the present application will now be described in more detail with reference to exemplary embodiments of the apparatus and method, given by way of example, and with reference to the accompanying drawings. In the drawings, like reference numerals designate corresponding parts throughout the several views. Wherever possible, the same reference numbers are used throughout the drawings to refer to the same or like elements of the embodiments.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Fuel Storage System

Some of the disclosed embodiments relate to a fuel storage system that is disclosed below in the context of a vehicle. In the embodiments, a vehicle can include an automobile, a truck, a van, a minivan, a sport utility vehicle (SUV), a bus, a recreational vehicle, an amusement park vehicle, a golf cart, a tractor, a robotically controlled vehicle or automated drive vehicle, a remote controlled vehicle, a drone, a motorcycle, a scooter, a moped, an all-terrain vehicle, a train, a boat or personal watercraft, a fixed-wing aircraft or helicopter, or any transport related entity. In fact, the various disclosed methods and apparatus are intended to be usable with any type of mode of transport that can travel along, or can be located in proximity to, any improved, unimproved, and/or unmarked route or path and can incorporate a fuel storage system to supply fuel to an engine. The disclosed fuel storage system is intended to be implemented with any known, related art, or later developed technologies.

Figure 1:
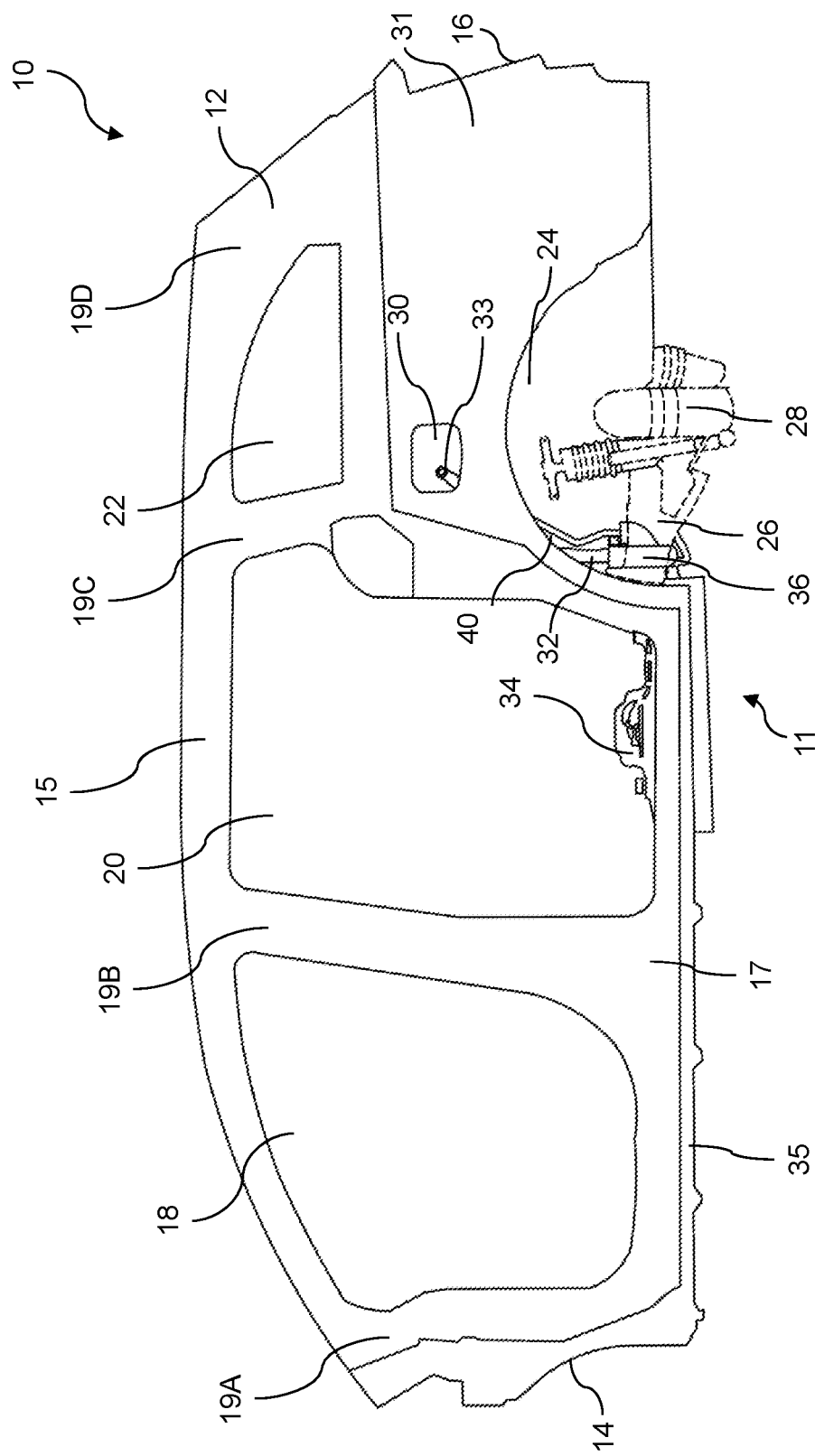
FIG. 1 is an exterior side view of a body of a vehicle and an exemplary fuel storage system in accordance with the disclosed subject matter.

FIG. 1 is an exterior side view of a body 12 of a vehicle 10, and an exemplary fuel storage system 11 in accordance with the disclosed subject matter. The fuel storage system 11 can supply fuel to a power unit such as, but not limited to, an internal combustion engine, which is not illustrated. The fuel storage system 11 can be configured to attach to the body 12.

The body 12 can be defined at extremities by a vehicle body front portion 14, a vehicle body rear portion 16, a roof rail 15, a rocker panel 17, and an underside 35. The side of the body 12 can include a front door opening 18, a rear door opening 20, and a window opening 22, duplicates of which are disposed on an opposite side. The front door opening 18 is disposed between an A-pillar 19A and a B-pillar 19B. The rear door opening 20 is disposed between the B-pillar 19B and a C-pillar 19C.

The A-pillar 19A can be located at the vehicle body front portion 14 and typically can include an outer body panel that has a door flange and a windshield flange along adjacent edges (not illustrated). The A-pillar 19A extends upwardly and attaches to a front corner of the vehicle roof rail 15. The B-pillar 19B extends upwardly from the rocker panel 17 to the roof rail 15 at a location relatively between the front and rear door openings 18, 20. The C-pillar 19C can be defined by reinforcement members that extend between the rocker panel 17 and the roof rail 15 and effectively links or integrates the structural assembly defining a rearward extent of the rear door opening 20 with upper and lower structural assemblies defining the upper and lower extents of the rear door opening 20.

A D-pillar 19D, or rear pillar, can be disposed at the vehicle body rear portion 16 with an inclination in a state of rising forward such that an upper end thereof is located forward of a lower end. The upper end of the D-pillar 19D is joined with the roof rail 15 and a lower frame member obscured by the rear body panel 31 in FIG. 1. The window opening 22 is disposed at the upper part of the vehicle body rear portion 16 between the C-pillar 19C and the D-pillar 19D.

Further, the body 12 of the vehicle 10 includes a rear wheel house 24 and a rear body panel 31. The wheel house 24 extends inwardly of the rear body panel 31 and rearward of the C-pillar 19C. Further, the wheel house 24 can house a suspension component 26, for example a trailing arm, of a rear suspension assembly 28, which can further include devices such as, but not limited to, a damper, a coil spring, a rotor, brake components, and a brake wiring harness, which are illustrated schematically and in phantom for clarity and simplicity of FIG. 1. The rear body panel 31 can also include a fuel filler recess 30 that defines an opening therethrough, which is disposed in an upper-frontal area of the rear body panel 31 and upward from the wheel house 24. However, embodiments are intended to include or otherwise cover any appropriate location on the rear body panel, or any other appropriate location on the vehicle 10. The fuel filler recess 30 is generally covered by a fuel filler door (not shown) to prevent dirt and other impurities from entering the fuel filler area and/or restrict unauthorized access to a fuel filler pipe 32, although this is not required.

The fuel storage system 11 can include a fuel tank 34 in which liquid fuel (hereinafter referred to as fuel) is stored, and can include a conventional fuel pump for supplying fuel to an internal combustion engine, which is not illustrated. The fuel tank 34 can be formed from a metallic material, a synthetic resin material, or any material that can accomplish the functions of the fuel storage system 11 of the embodiments. The fuel tank 34 can be disposed under a passenger compartment of the vehicle 10. However, embodiments are intended to include or otherwise cover the fuel tank 34 being positioned at any appropriate portion of the vehicle 10.

Figure 3:
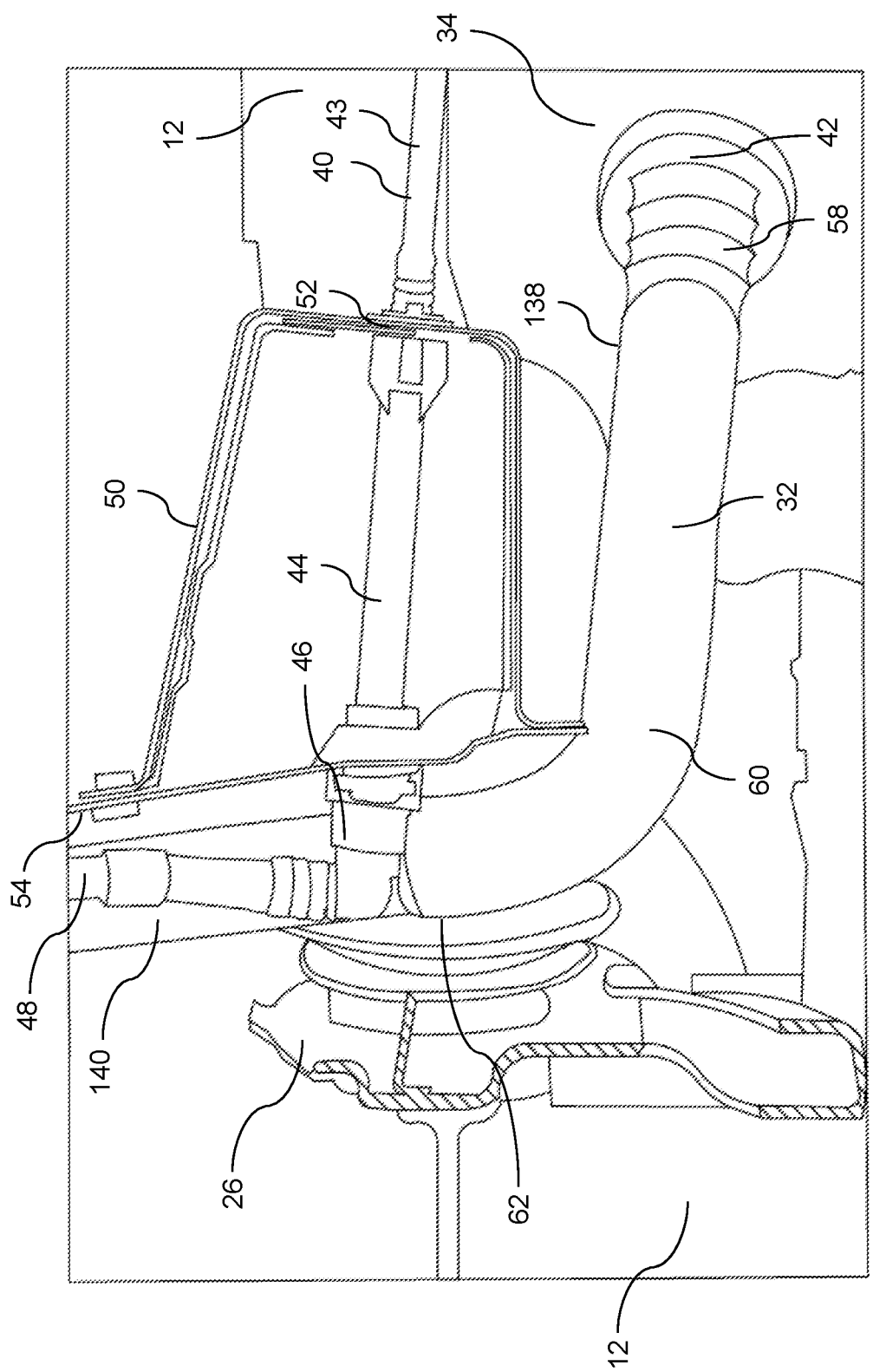
FIG. 3 is a rear view of a portion of the fuel storage system of FIG. 1 with an exemplary cover assembly omitted.
Figure 4:
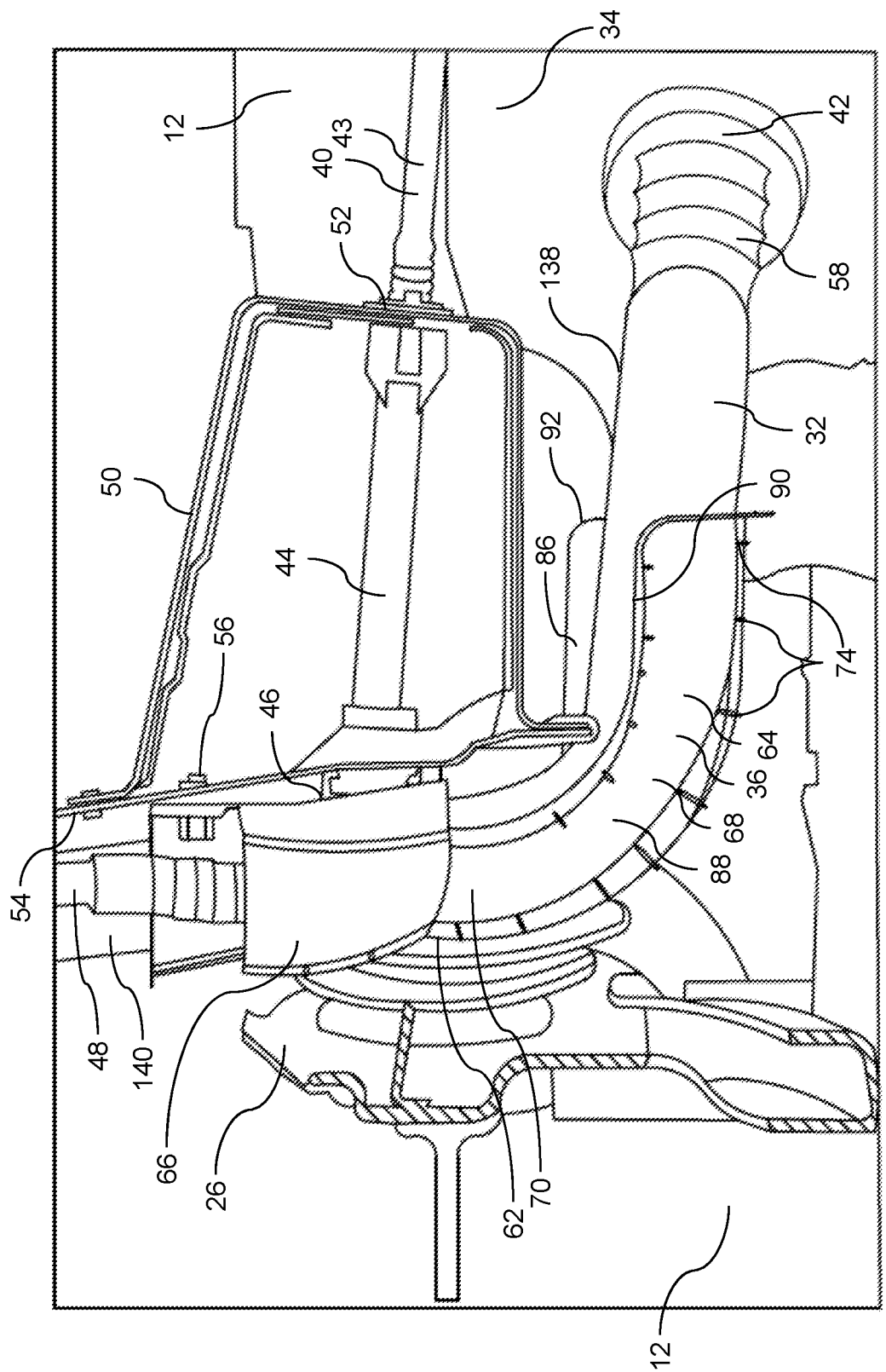
FIG. 4 is a rear view of a portion of the exemplary fuel storage system of FIG. 1.

The fuel storage system 11 can further include the fuel filler pipe 32. The fuel filler pipe 32 can be configured as a hollow tube with an inner wall and outer perimeter. The fuel filler pipe 32 can be fluidly connected to the fuel tank 34. Referring to FIGS. 3 and 4, the fuel filler pipe 32 can include an inlet portion 140, connected at a first or upper end to a filling port 33, a filler neck portion 60, and an outlet portion 138 that can connect to the fuel tank 34. The fuel filler pipe 32 can be fabricated from any suitable material that enables the fuel storage system 11 to function as described herein. The filling port 33 is disposed within the fuel filler recess 30 in a relatively upright posture and can be adapted to receive a nozzle from a fuel filling gun (not illustrated) that can insert into the filling port 33 when refilling the fuel tank 32 with fuel. The fuel storage system 11 can further include a breather pipe 40, also referred to as a fuel tank vent pipe, which can be configured as a hollow tube or a plurality of hollow tubes connected together for fluid communication with the fuel tank 34 at a first, or lower, end. The breather pipe 40 can connect to and be in fluid communication with an upper portion of the fuel filler pipe 32 relatively near the filling port 33.

Referring to FIG. 1, the fuel storage system 11 can further include a cover assembly 36. The cover assembly 36 can be fabricated from any suitable material that enables the fuel storage system 11 to function as described herein. The cover assembly 36 can be disposed at a front portion of the wheel house 24 and can be interposed between the suspension component 26 and other components(s) of the rear suspension assembly 28. The cover assembly 36 can rigidly mount to any appropriate location on the body 12 or to any appropriate rigid member attached to the body 12.

Figure 2:
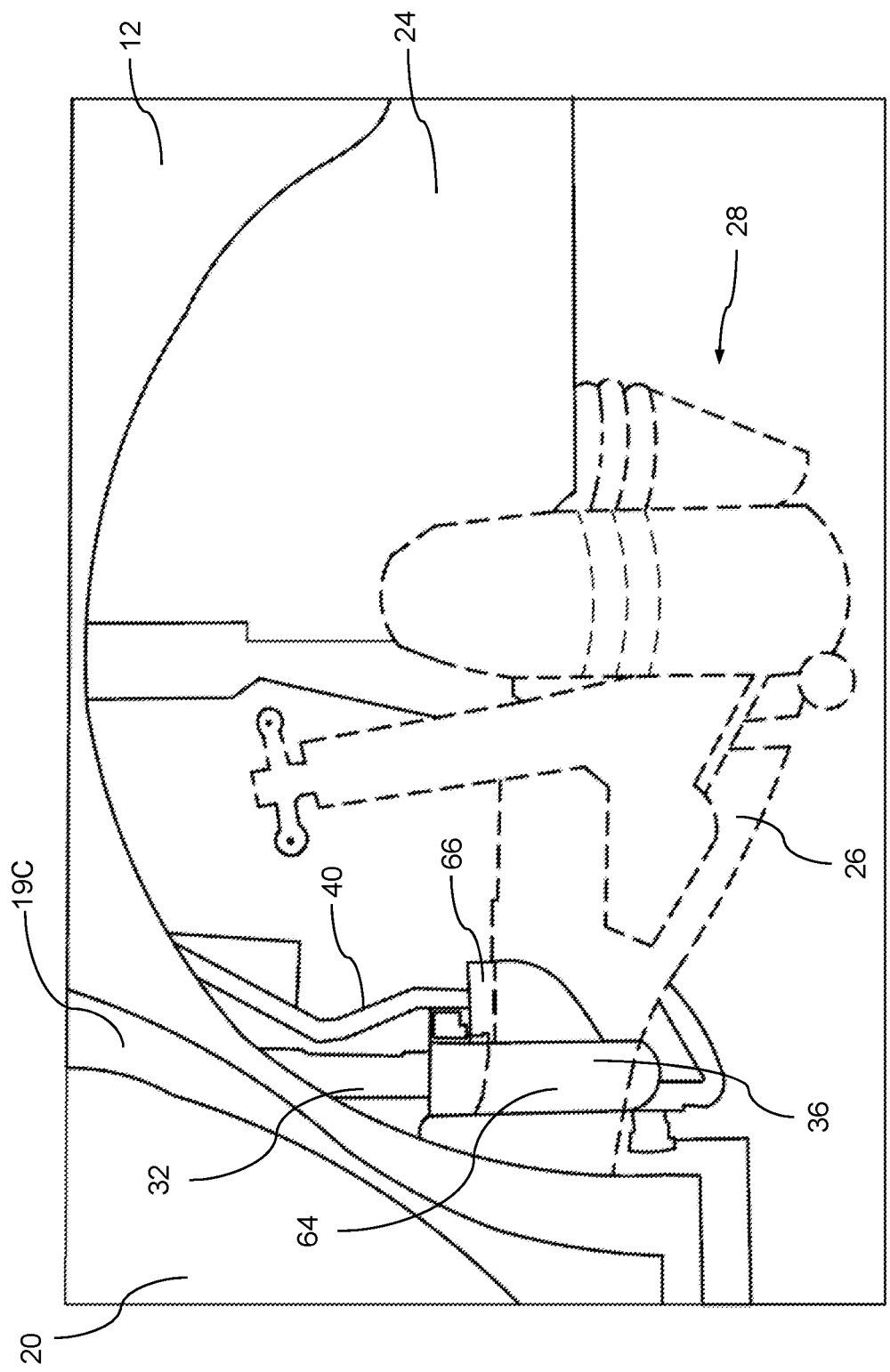
FIG. 2 is an enlarged view of a portion of FIG. 1.

FIG. 2 is an enlarged view of a wheel house portion of FIG. 1. The wheel house 24 of the body 12 is disposed adjacent to the rear body panel 31 and rearward of the C-pillar 19C. The cover assembly 36 can include a first portion 64 that can be configured as a curved walled member and a second portion 66 that can be configured as a receptacle-like member. In an embodiment, the cover assembly 36 can be fabricated as a single piece. However, embodiments are intended to include, or otherwise cover, the cover assembly 36 fabricated as two or more pieces that can cooperatively function with the fuel storage system 11 as described herein. The first portion 64 can be configured to fit partially around the fuel filler pipe 32 and the second portion 66 can be configured to house a connector portion 46 of the breather pipe 40. One function of the cover assembly 36 is to protect the fuel filler pipe 32 and the breather pipe 40 from chipping damage, such as debris that can be projected against the fuel filler pipe 32 and the breather pipe 40. In other words, the cover assembly 36 can impede the contact with the fuel filler pipe 32 and the breather pipe 40 of various types of substances or conditions, such as gasses, liquids, solids, etc., which are disposed or otherwise in existence outside of the vehicle 10.

FIG. 3 is a rear view of a portion of the fuel storage system 11 of FIG. 1 with the cover assembly 36 omitted to more clearly show the structure of the fuel filler pipe 32. The fuel storage system 11 can include the fuel tank 34, the fuel filler pipe 32, the breather pipe 40, and a frame member 50. The fuel filler pipe 32 can be fabricated as a hollow tube with a circular, elliptical, or polygonal cross-section and can be manufactured with flexible, non-metallic material such as rubber, resin, etc. which has oil resistance, heat resistance, and weatherability or other appropriate material. In fact, the fuel filler pipe 32 could have any non-planar cross-sectional shape that enables the fuel filler pipe 32 to function as described herein. The fuel filler pipe 32 can also be fabricated as a plain hollow tube or a hollow tube that is corrugated, which can provide additional material to flexibly expand or grow. A section of the fuel filler pipe 32 is shown as a corrugated portion 58 for purposes of clarity of the disclosure. A lower end of the fuel filler pipe 32 can be connected to the fuel tank 34 and can be secured and sealed with a sealing flange 42 in any appropriate manner, such as, but not limited to, mechanical fasteners, glue, epoxy, welding, interference fitting, etc. The fuel filler pipe 32 can extend inside the wheel house 24 in an upwardly horizontal direction away from the fuel tank 34 for a predetermined length, and bend vertically upward at the filler neck portion 60 that is disposed near to, but not abutting, the suspension component 26. The filler neck portion 60 can further extend upwardly through the inside of the wheel house 24 and attach to the filling port 33, which is secured to the rear body panel 31.

The breather pipe 40 can be a hollow cylindrical pipe or tube that can be fabricated with any appropriate material to function as described herein. The breather pipe 40 can include a first portion 43, an intermediate portion 44, and an end portion 48 that can define a path for vapors from the fuel tank 34. The first portion 43 can sealingly attach at one end to a top wall or a top portion of the fuel tank 34, thereby providing fluidic communication between the breather pipe 40 and the fuel tank 34, and extend in an upwardly horizontal direction away from the fuel tank 34. A second end of the first portion 43 can sealingly attach to the intermediate portion 44 at a seal joint 52. The intermediate portion 44 of the breather pipe 40 can extend from the seal joint 52 in an upwardly horizontal direction away from the fuel tank 34 and can sealingly attach to the end portion 48 via the connector portion 46. One end of the end portion 48 can connect to the connector portion 46 at a side connection point such that the end portion 48 extends from the connector portion 46 in a vertically upward direction. A second end of the end portion 48 can provide a path for fuel vapors to escape outside of the vehicle 10. In other embodiments, the breather pipe 40 could be connected to a fuel vapor recovery system.

The intermediate portion 44 of the breather pipe 40 can pass through the frame member 50 that forms a portion of the vehicle frame or a portion of a suspension sub-frame. The frame member 50 can provide a rigid structure to control the pipe layout of the breather pipe 40 and can be fabricated from any appropriate material including but not limited to metal. The frame member 50 can be generally channel-shaped in cross-section and has at its peripheral end a flange 54. The flange 54 can be secured with a plurality of metal fasteners to any appropriate location on the body 12, such as an inward side surface of the wheel house 24. The transition of the breather pipe 40 from generally an upwardly horizontal first portion 43 and intermediate portion 44 to end portion 48 occurs at the connector portion 46, which is disposed outside of the frame member 50. The connector portion 46 is therefore exposed to debris from outside of the vehicle 10.

Some bending of the fuel filler pipe 32 is necessary to navigate a path around the suspension component 26 from the filling port 33 to the fuel tank 34. The path requires a vertical drop of the fuel filler pipe 32 from the filling port 33 and bending at the filler neck portion 60 into a near horizontal extension that connects to the fuel tank 34 at the sealing flange 42. Some fuel filler pipes accomplish the bending requirements using corrugated pipe fabrication.

The fuel filler pipe 32 can, in some instances, be susceptible to expansion due to adverse thermal stresses or fuel volume. Some thermal stresses affecting the fuel filler pipe 32 can be caused externally from high ambient temperatures and some can be caused by elevated temperatures in the fuel. Linear expansion and/or swelling of the fuel filter pipe 32 can be particularly problematic in the filler neck portion 60, which is disposed close to the suspension component 26. Thus, adding fuel or heat to such a portion of the fuel filler pipe 32 can change the relative positioning of the fuel filler pipe 32. When the fuel filler pipe 32 expands, space in a gap area 62 between the fuel filter pipe 32 and the suspension component 26 can reduce or close, which can permit the fuel filler pipe 32 to contact these and other components. Additionally, gaps between other vehicle components around the fuel filter pipe 32, such as brake wiring parts (not illustrated) are reduced or closed. In some instances, the fuel filler pipe 32 can expand to the point of contact with the suspension component 26 at gap area 62.

II. Cover Assembly

FIG. 4 is a rear view of a portion of the exemplary fuel storage system 11 of FIG. 1. The first portion 64 is illustrated holding the fuel filler pipe 32 and the second portion is illustrated housing the connector portion 46. In the embodiments, the first portion 64 of the cover assembly 36 can be configured to partially surround and directly contact an outer perimeter of the fuel filler pipe 32 to restrict or limit the movement of the fuel filler pipe 32. The first portion 64 of the cover assembly 36 can restrict or limit the movement along straight sections as well as bends of the fuel filler pipe 32. In an embodiment, the first portion 64 can fit around the filler neck portion 60 and extend along the fuel filler pipe 32 for a majority of the length of the fuel filler pipe 32.

Figure 5:
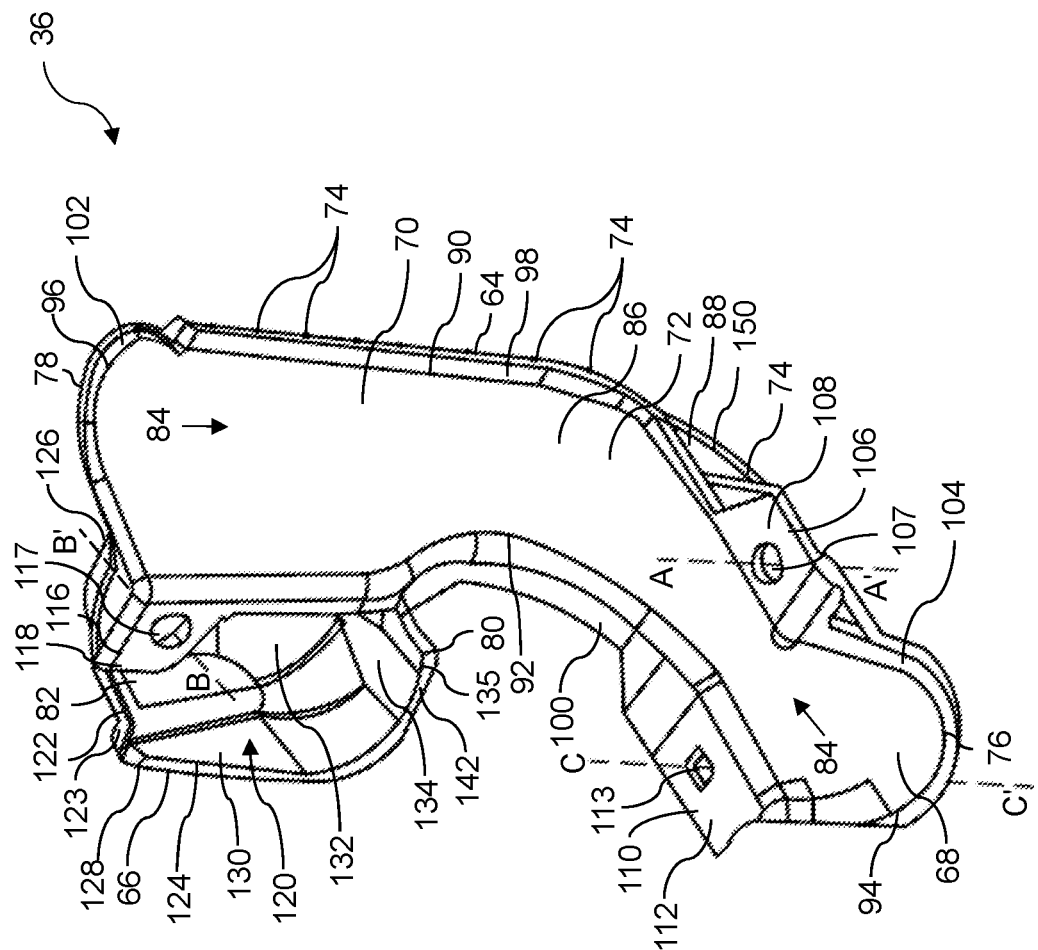
FIG. 5 is a perspective view of first embodiment of an exemplary cover in accordance with the disclosed subject matter.

The first portion 64 of the cover assembly 36 can also include a first extension 68 and a second extension 70 that define a wall 86 with a reverse side 88. The first extension 68 can extend in a first direction and the second extension 70 can extend in a second direction that intersects the first extension 68 at an angle 72. As shown in FIG. 5, the first extension 68 and the second extension 70 can each be configured as portions forming the wall 86. The wall 86 can be configured with a semi-circular cross-sectional area to form a channel 84. The wall 86 can be configured to restrict or limit movement of the fuel filler pipe 32 within the channel 84. In an embodiment, the first extension 68 can extend from the filler neck portion 60 of the fuel filler pipe 32 in a downward-horizontal direction along the outlet portion 138 towards the fuel tank 34. In contrast, the second extension 70 can extend from the filler neck portion 60 in an upward direction along the inlet portion 140 towards the filling port 33. In the embodiments, the cover assembly 36 can extend a majority, less than a majority, or an entire length of the fuel filler pipe 32. In fact, the embodiments intend to include, or otherwise cover, any length of the cover assembly 36 that can restrict or limit movement of the fuel filler pipe 32. The first portion 64 and the second portion 66 can be rigidly secured to the frame member 50 by a mechanical fastener 56.

The first portion 64 can be configured so that the outer perimeter of the fuel filler pipe 32 disposed closest to the suspension component 26 is covered by the first portion 64. An exposed section of the fuel filler pipe 32, when fitted to the first portion 64, can be allowed to move or expand if the fuel filler pipe 32 swells due to fuel, thermal stresses, etc. In an embodiment, the channel 84 at the second extension 70 can be disposed facing away from the suspension component 26 when the first portion 64 is fitted to the fuel filler pipe inlet portion 140, as shown in FIG. 4. The wall 86 at the second extension 70 can thusly be disposed facing towards the suspension component 26. The embodiments intend to include, or otherwise cover, any disposition of the wall 86 of the first portion 64 along the fuel filler pipe 32 that can impede or protect the fuel filler pipe 32 from inadvertent contact with vehicle components.

The first portion 64 of the cover assembly 36 can be configured to partially wrap around the circumference of the fuel filler pipe 32. The cover assembly 36 can restrict or limit movement of the fuel filler pipe 32 if the fuel filler pipe 32 swells or expands due to thermal stresses, fuel, etc. In one embodiment, to restrict or limit movement of the fuel filler pipe 32 relative to neighboring surfaces of the vehicle 10, the wall 86 of the first portion 64 can be disposed around a portion of the circumference of the fuel filler pipe 32, if the fuel filler pipe 32 is a round pipe so as to leave a section of an outer perimeter of the fuel filler pipe 32 exposed to allow movement of the exposed outer perimeter section. In some embodiments, the wall 86 can be disposed around any appropriate portion of the fuel filler pipe 32 that leaves a section of the outer perimeter of the fuel filler pipe 32 exposed to allow movement of the exposed outer perimeter section. For example, the wall 86 can be disposed around half of the outer perimeter of the fuel filler pipe 32, more than half of the outer perimeter of the fuel filler pipe 32, or less than a half of the outer perimeter of the fuel filler pipe 32. In another embodiment, the wall 86 may cover and/or contact three sides of the fuel filler pipe 32 but leave at least one side of the fuel filler pipe 32 exposed to allow movement of the exposed side. If the fuel filler pipe 32 is a square pipe, the wall 86 can cover at least a portion of one or more of the sides of the fuel filler pipe 32. In other embodiments the fuel filler pipe 32 could have a multi-sided cross-section, in which case the wall 86 of the first portion 64 can cover at least a portion of one or more sides of the fuel filler pipe 32. In another embodiment, the wall 86 can be disposed around the fuel filler pipe 32 at a circumferential distance a majority of the circumference of the fuel filler pipe 32 or a majority of the number of sides of a polygonally-shaped fuel filler pipe 32, thereby leaving a section of the outer perimeter of the fuel filler pipe 32 exposed to allow movement of the exposed outer perimeter section. In other embodiments, the first portion 64 can surround the fuel filler pipe 32 circumferentially by more than 180 degrees but less than 360 degrees, in order to restrict or limit movement of the fuel filler pipe 32.

FIG. 5 is a perspective view of the first portion 64 and the second portion 66 of the exemplary cover assembly 36. The first portion 64 of the cover assembly 36 can be further defined by a first end 76 and a second end 78, upwardly disposed from the first end 76. The first extension 68 of the first portion 64 extends to an inflection point 72, which can be defined as a transition area of the first portion 64 where the first extension 68 can turn at an angle and transition into the second extension 70, which can be disposed in an upward or nearly vertical orientation. The wall 86 of the first portion 64 can be formed as a smooth surface with a semi-circular or channel-shaped cross-section. However, the embodiments intend to include, or otherwise cover, the wall 86 formed with any non-planar cross-sectional shape that can accomplish the functions of the embodiments for the cover assembly 36. The wall 86 can be defined at its extremities by a first lateral edge 90 disposed along the length of the wall 86, a second lateral edge 92, disposed along the length of the wall 86 and opposite the first lateral edge 90, a first end edge 94, and a second end edge 96. The wall 86 can be further defined as forming the channel 84 that extends along the smooth surface from the first end edge 94 to the second end edge 96. The first end 76 and the second end 78 of the first portion 64 are open or unobstructed, thereby configuring the channel 84 to hold the fuel filler pipe 32.

The first portion 64 of the cover assembly 36 can include a plurality of flanged portions 98, 100, 102, 104 disposed around the perimeter of the wall 86. The flanged portion 98 can join to the first lateral edge 90 and extend perpendicularly outward from the periphery of the wall 86. The flanged portion 100 can join to the second lateral edge 92 and extend perpendicularly outward from the periphery of the wall 86. The flanged portion 104 can join to the first end edge 94 and extend perpendicularly outward from the periphery of the wall 86, and the flanged portion 102 can join to the second end edge 96 and extend perpendicularly outward from the periphery of the wall 86.

In the embodiment, the cover assembly 36 can include at a pair of rigid mounts that can be used to connect the cover assembly 36 to the body 12 of the vehicle 10. A first mount 106 can rigidly secure the first extension 68 of the cover assembly 36 to the vehicle body 12 in the direction of a first mount axis A-A'. The first mount 106 can define a first mount aperture 107 disposed through a first mount flange 108 that can extend substantially perpendicularly outward from the first lateral edge 90 of the wall 86. The first mount axis A-A' can be oriented substantially perpendicular to the first mount flange 108. The first mount aperture 107 can be configured to receive a mechanical fastener such as, but not limited to, a screw, a bolt, a pin, etc. In FIG. 5, the first mount 106 can be disposed at an intersection of the first end edge 94 and the first lateral edge 90. However, the embodiments are intended to include, or otherwise cover, any appropriate location of the first mount 106 and the first mount flange 108 on the cover assembly 36. In other embodiments, the first mount 106 can include any appropriate mount, such as the first mount aperture 107 formed through the first mount flange 108, which can function to mount the cover assembly 36 to the body 12 in any appropriate manner including, but not limited to, mechanical fasteners, glue, epoxy, welding, interference fitting, etc. The cover assembly 36 can also include a second mount 116 that can rigidly secure the second extension 70 of the cover assembly 36 to the vehicle body 12. The second mount 116 can define a second mount aperture 117 disposed through a second mount flange 118 that can extend perpendicularly outward from the second lateral edge 92 of the wall 86, such that a second mount axis B-B' can be oriented substantially perpendicular to the first mount axis A-A'. The second mount aperture 117 can be configured to receive a mechanical fastener such as, but not limited to, a screw, a bolt, a pin, etc. In FIG. 5, the second mount 116 can be disposed at an intersection of the second end edge 96 and the second lateral edge 92 of the wall 86. However, the embodiments are intended to include, or otherwise cover, any appropriate location of the second mount 116 and the second mount flange 118 on the cover assembly 36. In other embodiments, the second mount 116 can include any appropriate mount, such as the second mount aperture 117 formed through the second mount flange 118, which can function to mount the cover assembly 36 to the body 12 in any appropriate manner including, but not limited to, mechanical fasteners, glue, epoxy, welding, interference fitting, etc. Although a pair of mounts is illustrated in FIG. 5, the embodiments intend to include, or otherwise cover, one, two, or more than two mounts that can function to mount the cover assembly 36 to the body 12.

The cover assembly 36 can further include a clipping mount 110 that can define a clipping mount aperture 113 formed in a clipping mount flange 112. The clipping mount 110 can be used as a mount for a wiring harness, such as a braking wiring harness, or any other component that could be attached to the clipping mount 110. The clipping mount 110 can secure a component to the cover assembly 36 in the direction of a clipping mount axis C-C'. The clipping mount aperture 113 can be disposed on or through the clipping mount flange 112 that can extend perpendicularly outward from the second lateral edge 92 of the wall 86, such that the clipping mount axis C-C' can be oriented perpendicular to the clipping mount flange 112. In FIG. 5, the clipping mount 110 can be disposed at an intersection of the first end edge 94 and the second lateral edge 92. However, the embodiments are intended to include, or otherwise cover, any appropriate location of the clipping mount 110 and the clipping mount flange 112 on the cover assembly 36. The clipping mount 110 can include any appropriate mount, such as the clipping mount aperture 113 formed through the clipping mount flange 112.

In an embodiment, the first lateral edge 90 of the wall 86 can be elevated higher than the second lateral edge 92, thereby creating a lopsided shape of the channel 84. Such a configuration can be advantageous to provide additional structural support and/or placement for the first mount 106 to mount to the body 12. In an alternative embodiment, the first lateral edge 90 of the wall 86 could be elevated in such a manner as to extend beyond the fuel filler pipe 32, where an entire span of the wall 86 may not form-fit the fuel filler pipe 32. However, in such an alternative configuration a part of wall 86 may still wrap around a portion of the circumferential distance of the fuel filler pipe 32 or cover a portion of the number of sides of the fuel filler pipe 32 and still accomplish the functions of the cover assembly 36 described herein. Thus, the embodiments intend to include, or otherwise cover, any configuration of relative elevations of edges of the wall 86 that can accomplish the functions of the cover assembly 36 described herein.

The second portion 66 of the cover assembly 36 can be configured as a rigid member attached to the first portion 64 at any appropriate location and in any appropriate manner including, but not limited to, mechanical fasteners, glue, epoxy, welding, interference fitting, etc. In an embodiment, the second portion 66 can be disposed adjacent the second extension 70 of the first portion 64. In an embodiment, first portion 64 and the second portion 66 can be fabricated as a single piece. However, the embodiments intend to include, or otherwise cover, the first portion 64 and the second portion 66 fabricated as two or more pieces that can cooperate to perform the functions of the cover assembly 36 as described herein.

In an embodiment, the second portion 66 can be configured as a receptacle-like member that can be configured to house the connector portion 46 and function as a barrier to protect the connector portion 46 and from damage or chipping due to impacts from road debris. The second portion 66 can include a back wall 132, a side wall 130, and a bottom wall 134, which can define a bottom end 80. The second portion 66 can be configured with a top opening 82 where a top wall could otherwise be disposed, and a front opening 120 where a front wall could otherwise be disposed. The front opening 120 can provide an area that can receive the connector portion 46 in a horizontal orientation. The top opening 82 can provide a pass-through space for the end portion 48 of the breather pipe 40 to vertically extend away from the connector portion 46. A top edge 122 can join a flanged portion 123 that can perpendicularly extend away from a periphery of the back wall 132. A side edge 124 of the side wall 130 can join a flanged portion 128 that can perpendicularly extend away from a periphery of the side wall 130. A bottom edge 135 of the bottom wall 134 can join a flanged portion 142 that can perpendicularly extend away from a periphery of the bottom wall 134.

The first portion 64 can include the reverse side 88, and the second portion 66 can include a reverse side 126 that can each be configured with a plurality of reinforcement ribs 74. The reinforcement ribs 74 can add strength and structural rigidity to the cover assembly 36. In FIG. 5, a partial view of a reinforcement frame 150 that includes reinforcement ribs 74 is illustrated. On the first portion 64, portions of the reinforcement ribs 74 can be disposed behind, or underneath, the flanged portions 98, 100, 104, the first mount flange 108, the second mount flange 118, and the clipping mount flange 112. Such a configuration is advantageous to impede or prevent the reinforcement ribs 74 from contacting and possibly damaging the fuel filler pipe 32 and to add strength and rigidity to the flanged portions 98, 100, 104, the first mount flange 108, the second mount flange 118, and the clipping mount flange 112. On the second portion 66 of the cover assembly 36, various portions of the reinforcement ribs 74 can be disposed behind, or underneath, the flanged portions 123, 128, and 142, which can likewise be advantageous to impede or prevent the reinforcement ribs 74 from contacting the breather pipe 40 and the connector portion 46, and to add strength and rigidity to the flanged portions 123, 128, and 142.

Figure 6:
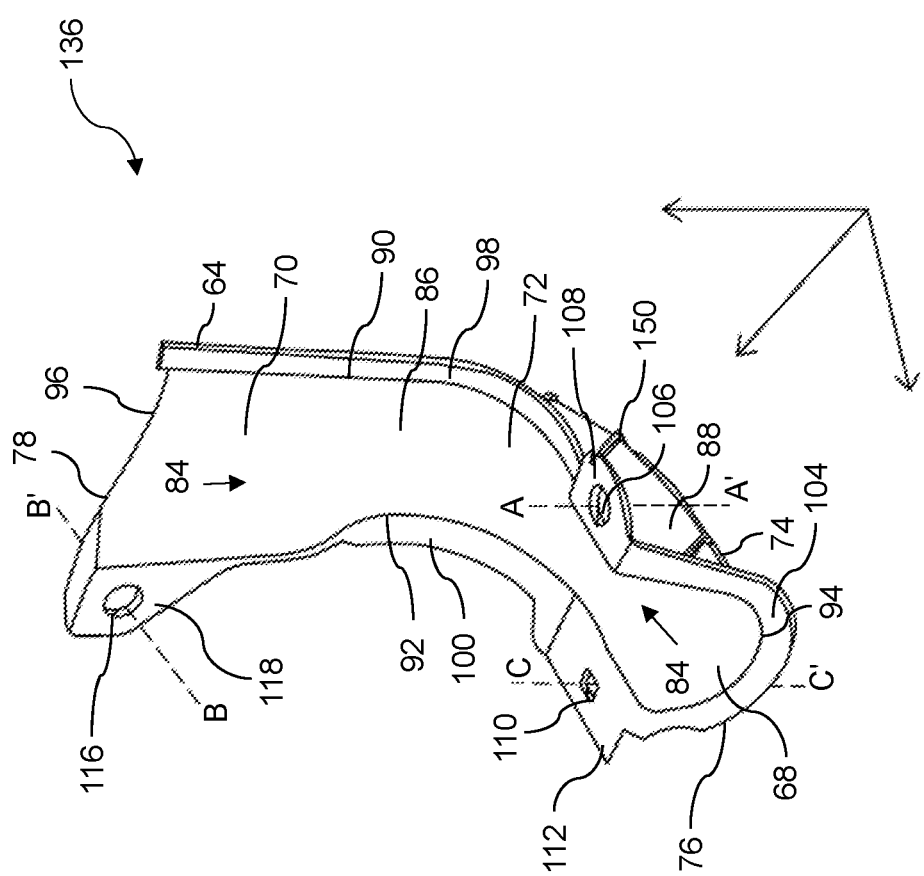
FIG. 6 is a perspective view of second embodiment of an exemplary cover in accordance with the disclosed subject matter.

FIG. 6 is a perspective of another embodiment of an exemplary cover 136. In the embodiments, the first portion 64 of the cover 136 can be configured to partially surround and directly contact an outer perimeter of the fuel filler pipe 32 to restrict or limit the movement of the fuel filler pipe 32. The first portion 64 of the cover 136 can restrict or limit the movement along straight sections as well as bends of the fuel filler pipe 32. In an embodiment, the first portion 64 can fit around the filler neck portion 60 and extend along the fuel filler pipe 32 for a predetermined distance. The first portion 64 of the cover 136 can be further defined by the first end 76 and the second end 78, upwardly disposed from the first end 76. In an embodiment, the first extension 68 can extend in a first direction and the second extension 70 can extend in a second direction that intersects the first extension 68 at an angle. In one embodiment, the first extension 68 can extend from the filler neck portion 60 of the fuel filler pipe 32 in a downward-horizontal direction along the outlet portion 138 towards the fuel tank 34. In contrast, the second extension 70 can extend from the filler neck portion 60 in an upward direction along the inlet portion 140 towards the filling port 33. The first extension 68 of the first portion 64 can upwardly extend to the inflection point 72, which can be defined as a transition area of the first portion 64 where the first extension 68 can turn at an angle and transitions into the second extension 70, which can be disposed in an upward or nearly vertical orientation. The wall 86 of the first portion 64 can be configured with a semi-circular cross-sectional area to form the channel 84. However, the embodiments intend to include, or otherwise cover, the wall 86 formed with any non-planar cross-sectional shape that can accomplish the functions of the embodiments for the cover 136. The wall 86 can be defined at its extremities by the first lateral edge 90 disposed along the length of the wall 86, the second lateral edge 92, disposed along the length of the wall 86 and opposite the first lateral edge 90, the first end edge 94, and the second end edge 96. The wall 86 can be further defined as forming the channel 84 that extends from the first end edge 94 to the second end edge 96. The wall 86 can be configured to restrict or limit movement of the fuel filler pipe 32 within the channel 84. In the embodiments, the cover 136 can extend a majority, less than a majority, or an entire length of the fuel filler pipe 32. In fact, the embodiments intend to include, or otherwise cover, any length of the cover 136 that can restrict or limit movement of the fuel filler pipe 32.

The first portion 64 of the cover 136 can be configured to partially wrap around the circumference of the fuel filler pipe 32. The cover 136 can restrict or limit movement the fuel filler pipe 32 if the fuel filler pipe 32 swells or expands due to thermal stresses, fuel, etc. In one embodiment, to restrict or limit movement of the fuel filler pipe 32 relative to neighboring surfaces of the vehicle 10, the wall 86 of the first portion 64 can be disposed around a portion of the circumference of the fuel filler pipe 32, if the fuel filler pipe is a round pipe so as to leave a section of an outer perimeter of the fuel filler pipe 32 exposed to allow movement of the exposed outer perimeter section. In some embodiments, the wall 86 can be disposed around any appropriate portion of the fuel filler pipe 32 that leaves a section of the outer perimeter of the fuel filler pipe 32 exposed to allow movement of the exposed outer perimeter section. For example, the wall 86 can be disposed around half of the outer perimeter of the fuel filler pipe 32, more than half of the outer perimeter of the fuel filler pipe 32, or less than a half of the outer perimeter of the fuel filler pipe 32. In another embodiment, the wall 86 may cover and/or contact three sides of the fuel filler pipe 32 but leave one side of the fuel filler pipe 32 exposed to allow movement of the exposed side. If the fuel filler pipe 32 is a square pipe, the wall 86 can cover at least a portion of one or more sides of the fuel filler pipe 32. In other embodiments, the fuel filler pipe 32 could have a multi-sided cross-section, in which case the wall 86 of the first portion 64 can cover at least a portion of one or more sides of the fuel filler pipe 32. In another embodiment, the wall 86 can be disposed around the fuel filler pipe 32 at a circumferential distance a majority of the circumference of the fuel filler pipe 32 or a majority of the number of sides of a polygonally-shaped fuel filler pipe 32, thereby leaving a section of the outer perimeter of the fuel filler pipe 32 exposed to allow movement of the exposed outer perimeter section. In other embodiments, the first portion 64 can surround the fuel filler pipe 32 circumferentially by more than 180 degrees but less than 360 degrees, in order to restrict or limit movement of the fuel filler pipe 32.

The first portion 64 of the cover 136 can include the flanged portions 98, 100, 104 disposed around the perimeter of the wall 86. The flanged portion 98 can join to the first lateral edge 90 and extend perpendicularly outward from the periphery of the wall 86. The flanged portion 100 can join to the second lateral edge 92 and extend perpendicularly outward from the periphery of the wall 86. The flanged portion 104 can join to the first end edge 94 and extend perpendicularly outward from the periphery of the wall 86.

In the embodiment, the cover 136 can include at a pair of rigid mounts that can be used to connect the cover 136 to the body 12 of the vehicle 10. The first mount 106 can rigidly secure the first extension 68 of the cover 136 to the vehicle body 12 in the direction of the first mount axis A-A'. The first mount 106 can define the first mount aperture 107 disposed through the first mount flange 108 that can extend substantially perpendicularly outward from the first lateral edge 90 of the wall 86. The first mount axis A-A' can be oriented substantially perpendicular to the first mount flange 108. The first mount aperture 107 can be configured to receive a mechanical fastener such as, but not limited to, a screw, a bolt, a pin, etc. In FIG. 6, the first mount 106 can be disposed at an intersection of the first end edge 94 and the first lateral edge 90. However, the embodiments are intended to include, or otherwise cover, any appropriate location of the first mount 106 and the first mount flange 108 on the cover 136. In other embodiments, the first mount 106 can include any appropriate mount, such as the first mount aperture 107 formed through the first mount flange 108, which can function to mount the cover 136 to the body 12 in any appropriate manner including, but not limited to, mechanical fasteners, glue, epoxy, welding, interference fitting, etc. The cover 136 can also include the second mount 116 that can rigidly secure the second extension 70 of the cover 136 to the vehicle body 12. The second mount 116 can define the second mount aperture 117 disposed through the second mount flange 118 that can extend perpendicularly outward from the second lateral edge 92 of the wall 86, such that the second mount axis B-B' can be oriented substantially perpendicular to the first mount axis A-A'. The second mount aperture 117 can be configured to receive a mechanical fastener such as, but not limited to, a screw, a bolt, a pin, etc. In FIG. 6, the second mount 116 can be disposed at an intersection of the second end edge 96 and the second lateral edge 92 of the wall 86. However, the embodiments are intended to include, or otherwise cover, any appropriate location of the second mount 116 and the second mount flange 118 on the cover 136. In other embodiments, the second mount 116 can include any appropriate mount, such as the second mount aperture 117 formed through the second mount flange 118, which can function to mount the cover 136 to the body 12 in any appropriate manner including, but not limited to, mechanical fasteners, glue, epoxy, welding, interference fitting, etc. Although the pair of mounts is illustrated in FIG. 6, the embodiments intend to include, or otherwise cover, one, two, or more than two mounts that can function to mount the cover 136 to the body 12.

The cover 136 can further include the clipping mount 110 that can define the clipping mount aperture 113 formed through the clipping mount flange 112. The clipping mount 110 can be used as a mount for a wiring harness, such as a braking wiring harness, or any other component that could be attached to the clipping mount 110. The clipping mount 110 can secure a component to the cover 136 in the direction of the clipping mount axis C-C'. The clipping mount flange 112, which can extend perpendicularly outward from the second lateral edge 92 of the wall 86, such that the clipping mount axis C-C' can be oriented perpendicular to the clipping mount flange 112. In FIG. 6, the clipping mount 110 can be disposed at an intersection of the first end edge 94 and the second lateral edge 92. However, the embodiments are intended to include, or otherwise cover, any appropriate location of the clipping mount 110 and the clipping mount flange 112 on the cover 136. The clipping mount 110 can include any appropriate mount, such as the clipping mount aperture 113 formed through the clipping mount flange 112.

In an embodiment, the first lateral edge 90 of the wall 86 can be elevated higher than the second lateral edge 92, thereby creating a lopsided channel 84. Such a configuration can be advantageous to provide additional structural support and/or placement for the first mount 106 to mount to the body 12. In an alternative embodiment, the first lateral edge 90 of the wall 86 could be elevated in such a manner as to extend beyond the fuel filler pipe 32, where an entire span of the wall 86 may not form-fit the fuel filler pipe 32. However, in such an alternative configuration a part of wall 86 may still wrap around a portion of the circumferential distance of the fuel filler pipe 32 or cover a portion of one or more sides of the fuel filler pipe 32 and still accomplish the functions of the cover 136 described herein. Thus, the embodiments intend to include, or otherwise cover, any configuration of relative elevations of edges of the wall 86 that can accomplish the functions of the cover 136 described herein.

Figure 7:
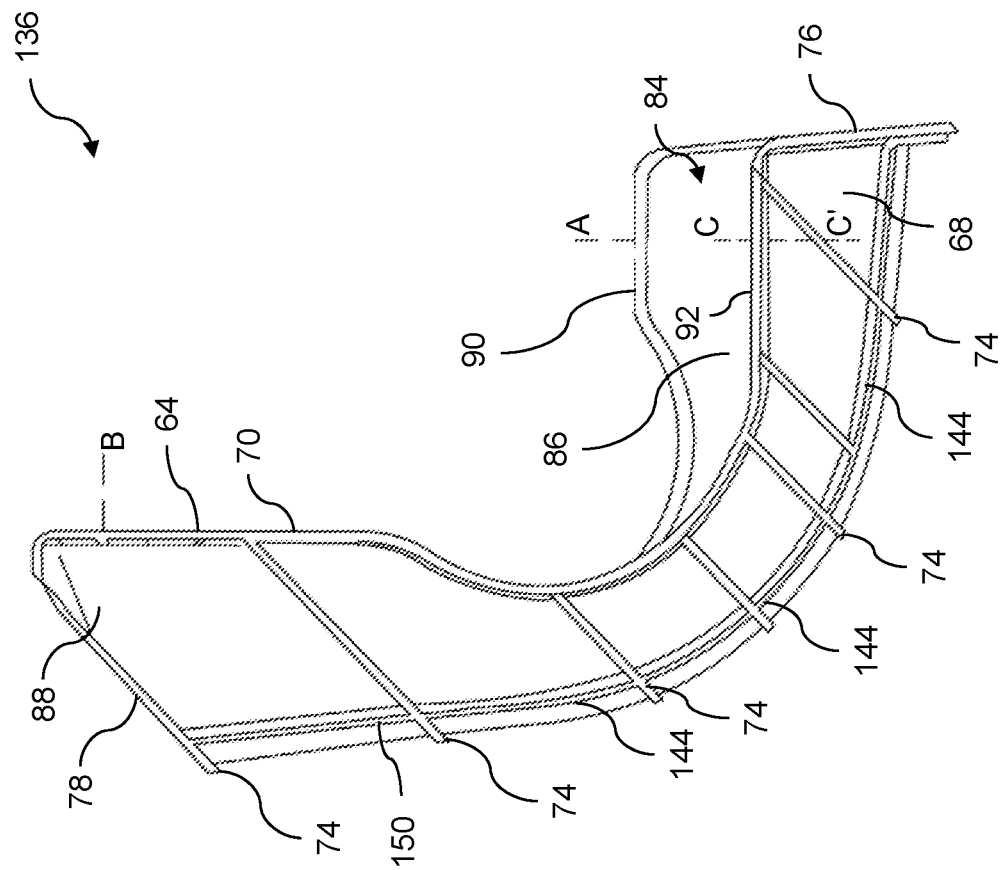
FIG. 7 is a side view of the exemplary cover of FIG. 6.

FIG. 7 is a side view of the exemplary cover 136 of FIG. 6. FIG. 7 includes a side view of the reverse side 88 of the first portion 64. In the embodiments, the reinforcement frame 150 can attach to, or be a unitary part of, the reverse side 88 of the cover 136. The reinforcement frame 150 can include a first frame support member 144 and the plurality of reinforcement ribs 74. The first frame support member 144 can extend from the first end 76 to the second end 78 and be disposed along a rearward path of the cover 136 that follows the contours of the reverse side 88 of the wall 86. The reinforcement ribs 74 can be spaced apart at varying intervals along the first frame support member 144 and can extend from the first frame support member 144 to the second lateral edge 92 in any appropriate configuration.

Figure 8:
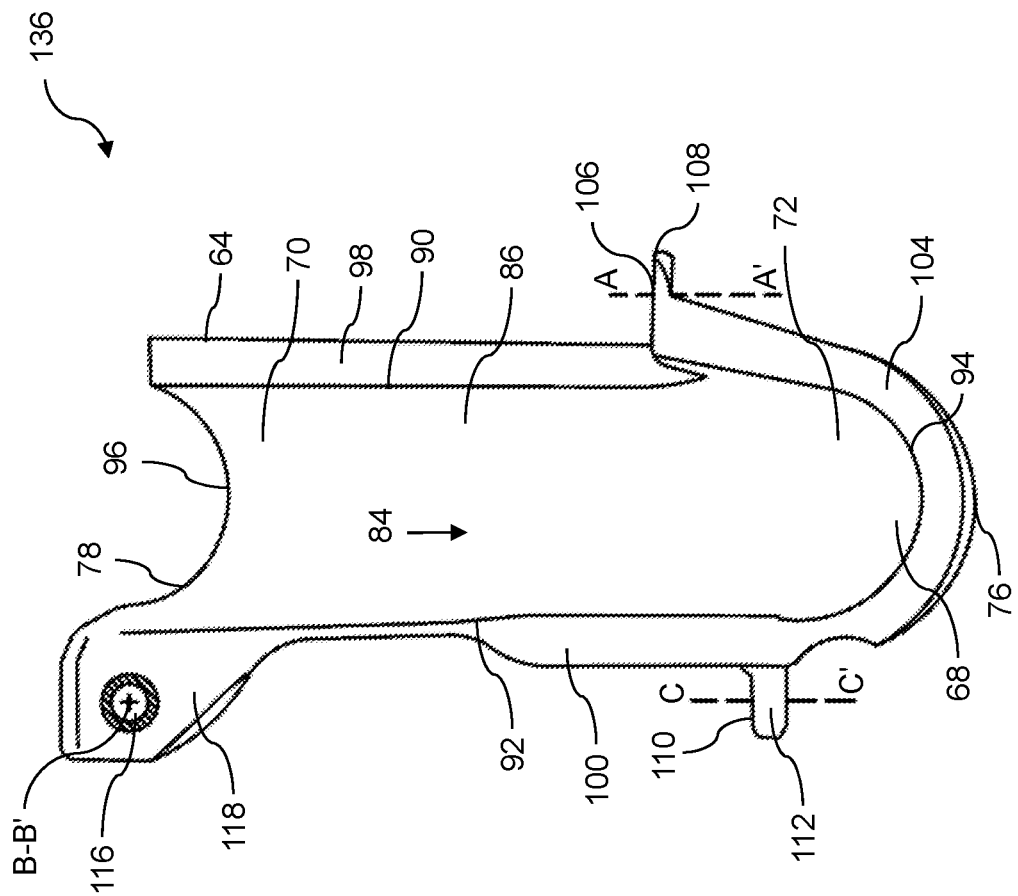
FIG. 8 a front view of the exemplary cover of FIG. 6.

FIG. 8 a front view of the exemplary cover 136 of FIG. 6. The cover 136 can be defined by the first end 76 and the second end 78, upwardly disposed from the first end 76. The first extension 68 of the cover 136 extends gently upward at an angle above horizontal to the inflection point 72, which can be defined as the transition area the first extension 68 can turn at an angle and transition into the second extension 70, which can be disposed in an upwardly or nearly vertical orientation. The wall 86 of the cover 136 can be formed as a smooth surface with a semi-circular or channel-shaped cross-section. However, the embodiments intend to include, or otherwise cover, the wall 86 formed with any non-planar cross-sectional shape that can accomplish the functions of the embodiments for the cover 136 The wall 86 can be defined at its extremities by the first lateral edge 90 disposed along the length of the wall 86, the second lateral edge 92, disposed along the length of the wall 86 and opposite the first lateral edge 90, the first end edge 94, and the second end edge 96. The wall 86 can be further defined as forming the channel 84 that extends along the smooth surface from the first end edge 94 to the second end edge 96. The first end 76 and the second end 78 of the first portion 64 are open or unobstructed, thereby configuring the channel 84 hold the fuel filler pipe 32.

The cover 136 can include the flanged portions 98, 100, and 104 disposed around the perimeter of the wall 86. The flanged portion 98 can join to the first lateral edge 90 and extend perpendicularly outward from the periphery of the wall 86. The flanged portion 100 can join to the second lateral edge 92 and extend perpendicularly outward from the periphery of the wall 86. The flanged portion 104 can join to the first end edge 94 and extend perpendicularly outward from the periphery of the wall 86.

In FIG. 8, the first mount axis A-A' of the first mount aperture 107 is shown oriented substantially perpendicular to the second mount axis B-B' of the second mount aperture 117. The clipping mount axis C-C' is shown oriented parallel to the first mount axis A-A' and substantially perpendicular to the second mount axis B-B'.

Figure 9:
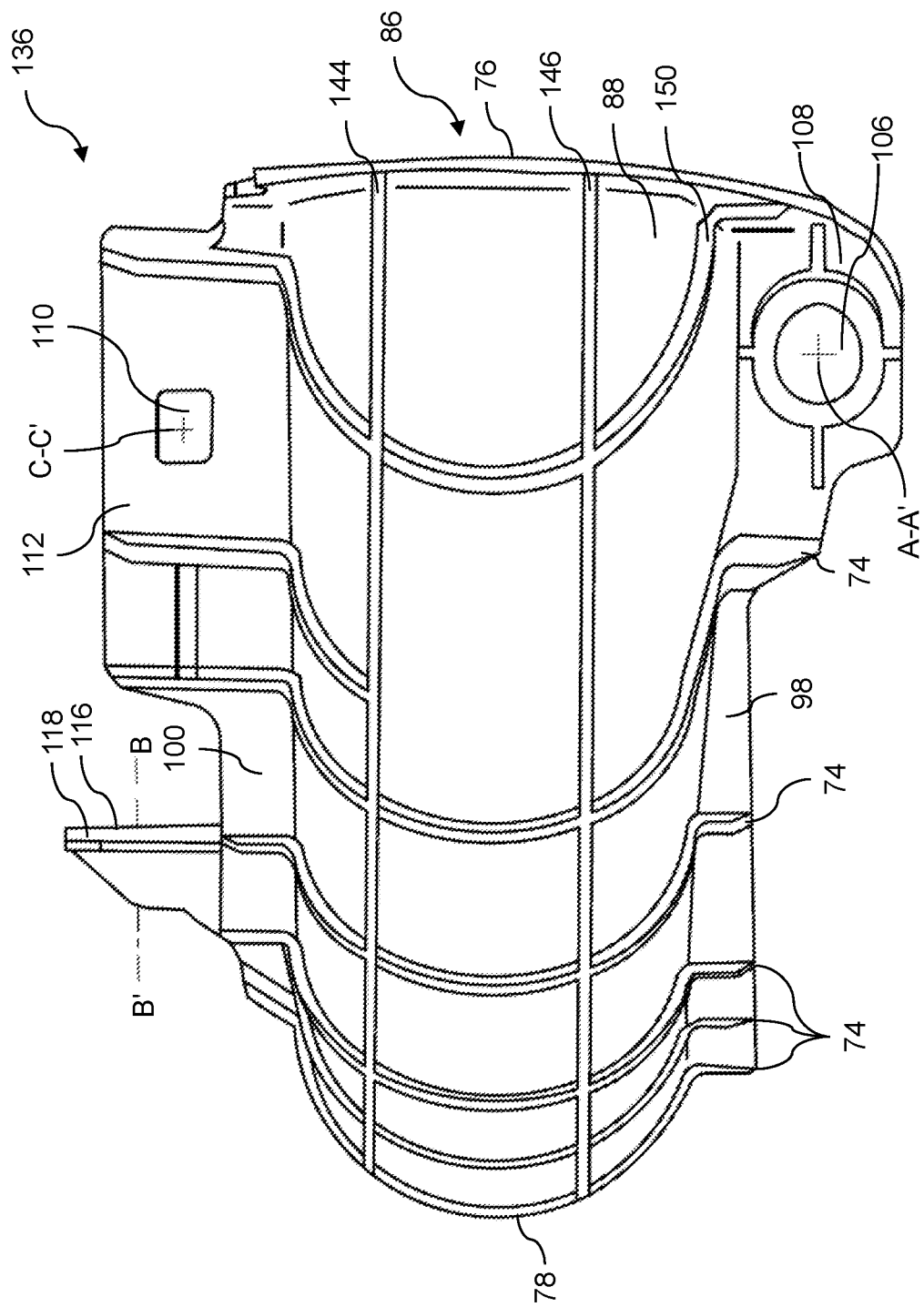
FIG. 9 is a bottom perspective view of exemplary cover of FIG. 6.

FIG. 9 is a bottom view of the exemplary cover 136 of FIG. 6. In the embodiments, the reinforcement frame 150 can attach to, or be a unitary part of, the reverse side 88 of the cover 136. The reinforcement frame 150 can include the first frame support member 144, a second frame support member 146, and the plurality of reinforcement ribs 74. The first frame support member 144 can extend from the first end 76 to the second end 78 and be disposed along a rearward path of the cover 136 that follows the contours of the reverse side 88 of the wall 86. The second frame support member 146 can extend parallel to the first frame support member 144 from the first end 76 to the second end 78 and be disposed along a rearward path of the cover 136 that follows the contours of the reverse side 88 of the wall 86. The reinforcement ribs 74 can be spaced apart at varying intervals along the first frame support member 144 and the second frame member 146. The reinforcement ribs 74 can extend between peripheral edges of the first mount flange 108 to peripheral edges of the clipping mount flange 112, from the peripheral edges of the flanged portion 98 to peripheral edges of the flanged portion 100, and to the second mount flange 118. In such a configuration, the reinforcement frame 150 can provide structural support for the wall 86 and the flanged portions 98, 100, the first mount flange 108, the second mount flange 118, and the clipping mount flange 112.

III. Alternative Embodiments

While certain embodiments of the invention are described above, and FIGS. 1-9 disclose the best mode for practicing the various inventive aspects, it should be understood that the invention can be embodied and configured in many different ways without departing from the spirit and scope of the invention.

Exemplary embodiments are intended to include or otherwise cover any type of manufacturing of the members, portions, extensions, and structures of the embodiments.

While certain embodiments for the cover assembly 36 and cover 136 are intended for use in a vehicle fuel storage system, the embodiments are intended to include or otherwise cover uses as a protective cover, pipe holding member, or clipping point for a wiring harness at any location on the vehicle 10.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A suspension and fuel storage assembly for a vehicle comprising:
   a vehicle suspension component;
   a fuel tank;
   a fuel filler pipe connected to the fuel tank and located between the fuel tank and the vehicle suspension component;
   a cover assembly having a first cover portion that includes
      a first extension that extends in a first direction and a second extension that extends in a second direction that intersects the first extension at an angle, the first and second extensions form a first cover portion wall which forms a channel, the first cover portion wall wraps around a portion of an outer perimeter of the fuel filler pipe, the first cover portion wall is positioned between the suspension component and the fuel filler pipe, the channel is opened in a direction that is away from the vehicle suspension component and the channel exposes an exposed section of the fuel filler pipe that extends along the channel so as to permit expansion of the exposed section away from the vehicle suspension component; and
      a pair of mounts that includes a first mount extending outward from a first edge of the first cover portion wall formed by the first extension and defining a first mount aperture, and a second mount extending outward from a second edge of the first cover portion wall formed by the second extension and defining a second mount aperture, an axis of the first mount aperture being substantially perpendicular to an axis of the second mount aperture.

2. The suspension and fuel storage assembly of claim 1, further comprising:
   a fuel tank breather pipe including a connector portion; and
   a second cover portion, attached to the first cover portion, defined by a receptacle-like member housing the connector portion for the fuel tank breather pipe that is disposed in one direction and a portion of the breather pipe that is disposed in a second direction.

3. The suspension and fuel storage assembly of claim 1, wherein the first cover portion extends along a portion of the outer perimeter of the fuel filler pipe closest to the vehicle suspension components.

4. The suspension and fuel storage assembly of claim 1, wherein the first cover portion wall is rigidly fit to the fuel filler pipe such that movement of the fuel filler pipe toward the vehicle suspension component is limited by the first cover portion.

5. The suspension and fuel storage assembly of claim 4, wherein the first cover portion wall is formed with a semi-circular cross-sectional area that wraps around a majority of the outer perimeter of the fuel filler pipe.

6. The suspension and fuel storage assembly of claim 2, wherein the second cover portion comprises a back wall, a side wall, and a bottom wall, wherein the back wall and bottom wall attach to the first cover portion to form the receptacle-like member.

7. The suspension and fuel storage assembly of claim 6, wherein the second cover portion comprises,
   a first flanged portion that perpendicularly extends away from a periphery of the back wall,
   a top edge that joins the first flanged portion,
   a second flanged portion that perpendicularly extends away from a periphery of the side wall,
   a side edge of the side wall that joins the second flanged portion,
   a third flanged portion that perpendicularly extends away from a periphery of the bottom wall,
   a bottom edge of the bottom wall that joins the third flanged portion,
   a front opening that receives the connector portion and is bounded by the side edge and the bottom edge, and
   a top opening that is bounded by the top edge and has a pass-through space for the portion of the breather pipe.

8. The suspension and fuel storage assembly of claim 1, further comprising:
   a first mount flange, which extends from the first edge of the first cover portion wall, which is configured with the first mount to mount the cover assembly.

9. The suspension and fuel storage assembly of claim 8, further comprising:
   a second mount flange, which extends from the second edge of the first cover portion wall, which is configured with the second mount to mount the cover assembly.

10. The suspension and fuel storage assembly of claim 1, further comprising:
    a clipping mount; and
    a clipping mount flange, which extends from the second edge of the first cover portion wall, which is configured with the clipping mount to secure a vehicle wiring component to the cover assembly.

11. The suspension and fuel storage assembly of claim 1, further comprising:
a reinforcement frame comprising a first frame support member, a second frame support member, and a plurality of reinforcement ribs, attached to a reverse side of the first cover portion, the reinforcement frame configured to extend from a first end to a second end of the first cover portion and be disposed along a rearward path that follows contours of the reverse side of the first cover portion.

12. A vehicle fuel storage system, comprising:
a fuel tank;
a fuel filler pipe attached at one end to the fuel tank;
a first cover portion that includes a first extension that extends in a first direction and a second extension that extends in a second direction that intersects the first extension at an angle, the first and second extensions form a first cover portion wall which forms a channel, the first cover portion wall wraps around a portion of an outer perimeter of the fuel filler pipe, the first cover portion exposes a section of the fuel filler pipe that extends along the first cover portion so as to permit movement of the exposed outer perimeter section, the first cover portion extending more than half a length of the fuel filler pipe; and
a pair of mounts that includes a first mount extending from a first edge of the first cover portion wall formed by the first extension and defining a first mount aperture, and a second mount extending from a second edge of the first cover portion wall formed by the second extension and defining a second mount aperture, an axis of the first mount aperture being substantially perpendicular to an axis of the second mount aperture.

13. The vehicle fuel storage system of claim 12, further comprising:
a second cover portion, attached to the first cover portion, defined by a receptacle-like member configured to house a connector portion for a fuel tank breather pipe that is disposed in one direction and a portion of the breather pipe that is disposed in a second direction.

14. The vehicle fuel storage system of claim 12, wherein the first cover portion is configured so that a portion of the outer perimeter of the fuel filler pipe closest to a vehicle suspension component is covered by the first cover portion.

15. The vehicle fuel storage system of claim 12, wherein the first cover portion wall is rigidly configured to fit to the fuel filler pipe such that movement of the fuel filler pipe is limited by the first cover portion.

16. The vehicle fuel storage system of claim 13, wherein the second cover portion comprises a back wall, a side wall, and a bottom wall, wherein the back wall and bottom wall attach to the first cover portion to form the receptacle-like member.

17. The vehicle fuel storage system of claim 12, further comprising:
a first mount flange, which extends from the first edge of the first cover portion wall, which is configured with the first mount to mount the cover assembly; and
a second mount flange, which extends from the second edge of the first cover portion wall, which is configured with the second mount to mount the cover assembly.

18. The vehicle fuel storage system of claim 12, further comprising:
a clipping mount; and
a clipping mount flange, which extends from the first edge of the first cover portion wall, which is configured with the clipping mount to secure a vehicle wiring component to the cover assembly.

19. The vehicle fuel storage system of claim 12, further comprising:
a reinforcement frame, comprising a first frame support member, a second frame support member, and a plurality of reinforcement ribs attached to a reverse side of the first cover portion, the reinforcement frame configured to extend from a first end to a second end of the first cover portion and be disposed along a rearward path that follows contours of the reverse side of the first cover portion.

20. The suspension and fuel storage assembly of claim 2, wherein the second cover portion is spaced away from the channel.

* * * * *